United States Patent
Bader et al.

(10) Patent No.: US 6,463,822 B1
(45) Date of Patent: Oct. 15, 2002

(54) AXIAL BEARING FOR TOOTHED WHEELS

(75) Inventors: Josef Bader, Friedrichshafen (DE); Jürgen Rauter, Friedrichshafen (DE); Stefan Renner, Bodman-Ludwigshafen (DE)

(73) Assignee: ZF Friedrichshafen AG, Friedrichshafen (DE)

(*) Notice: Subject to any disclaimer, the term of this patent is extended or adjusted under 35 U.S.C. 154(b) by 0 days.

(21) Appl. No.: 09/786,217

(22) PCT Filed: Sep. 3, 1999

(86) PCT No.: PCT/EP99/06495
§ 371 (c)(1),
(2), (4) Date: Mar. 1, 2001

(87) PCT Pub. No.: WO00/14432
PCT Pub. Date: Mar. 16, 2000

(30) Foreign Application Priority Data

Sep. 9, 1998 (DE) .................. 198 41 130.8

(51) Int. Cl.⁷ ............... F16H 3/08; F16H 57/02
(52) U.S. Cl. ....................... 74/333; 74/331
(58) Field of Search .............. 74/333, 331, 410; 384/455, 618, 450

(56) References Cited

U.S. PATENT DOCUMENTS 3,829,181 A 8/1974 Günther et al. ............. 308/174
5,921,137 A * 7/1999 Buri et al. .................. 74/339

FOREIGN PATENT DOCUMENTS

| DE | 707 768 | | 7/1941 |
| DE | 325 353 | | 12/1974 |
| DE | 29 08 016 | | 9/1980 |
| DE | 196 30 803 | | 2/1998 |
| DE | 19631063 | * | 2/1998 |
| DE | 196 33 281 A1 | | 2/1998 |
| DE | 19633282 | * | 2/1998 |
| DE | 19841130 | * | 3/2000 |
| EP | 0 841 501 A2 | | 5/1998 |
| FR | 2 176 409 | | 10/1973 |
| GB | 889871 | | 2/1962 |

* cited by examiner

Primary Examiner—Douglas C. Butler
(74) Attorney, Agent, or Firm—Davis & Bujold, P.L.L.C.

(57) ABSTRACT

The invention relates to a bearing for a toothed wheel (24) of a toothed gear in the area between a first shaft (20) and a second shaft (46) which can rotate coaxially and at different rotational speeds in relation to each other to compensate for axial forces in the direction of the axis of rotation (12) of the shaft (20, 46). The toothed wheel (24) is mounted on a plate (26) provided between a first (28) and a second (30) axial bearing. A plate (10, 14) is provided between the first shaft (20) and the first axial bearing (28) and between the second axial bearing (30) and the second shaft (46), respectively, which contacts the relevant shaft (20, 46) on a line (16, 18) and effects conical deforming movements about the lines (16, 18).

4 Claims, 1 Drawing Sheet

AXIAL BEARING FOR TOOTHED WHEELS

This application is a national stage or phase filing under 35 USC 371 of international application No. PCT/EP 99/06495 filed Sep. 3, 1999

FIELD OF THE INVENTION

The invention relates to a bearing for toothed wheels.

BACKGROUND OF THE INVENTION

In transmission having helical gears the toothed wheels are loaded by an axial force generated by the helical gears. Especially in transmissions having several countershafts for load distribution, in the toothed wheel of the second constant which is mounted in the area between the input shaft and a main shaft supported in or upon the input shaft, there arises in different load conditions the problem that the bearing of the toothed wheels is deformed by the axial forces. The toothed wheels mounted with some play on the input shaft or the main shaft in transmissions, having several identical countershafts for load distribution, are radially supported in the toothed wheels mounted on the countershafts, but they require an axial bearing so that they do not leave their axial position on the respective shaft. However, the axial forces from the helical gears try axially to move the position of the toothed wheel.

Essentially three operating conditions are distinguished:

In the first uncritical operating condition, the torque is transmitted by the input shaft of the transmission to the countershaft via the toothed wheel of the first constant. The axial bearing is loaded with relative uniformity.

The axial forces have an especially negative effect in the other two operating conditions. On one hand, this is the operating condition in which the torque flow is transmitted by the input shaft of the transmission to the countershafts via the toothed wheel of the second constant. From there, the torque is then transmitted to any toothed wheel connectable with the main shaft. The second problematic operating condition is reached when, to form a ratio step, the input shaft is connected with the main shaft, via the toothed wheels of the first and second constants, and the torque flows, via the toothed wheels of the two constants. The axial force appearing in the first operating condition tries axially to move the toothed wheel of the second constant in a direction away from the input shaft. The axial force appearing in the second operating condition, tries axially to move the toothed wheel of the second constant in a direction toward the input shaft. In both cases, the axial forces lead to a slanted position of the axial bearing of the toothed wheel of the second constant.

DE 196 33 281 has disclosed an axial bearing for the toothed wheel of the second constant. The plate used there is laterally enclosed by two roller bearings. The axial forces lead to a slanted position for the plate and this results in damage to the roller bearings in the form of edge brackets with the consequence of a clearly reduced service life of the bearings.

The problem on which the invention is based is to indicate a bearing which overcomes the problems of the slanted position for the roller bearings.

SUMMARY OF THE INVENTION

According to the invention, in a toothed wheel of a gear transmission, in the area between a first shaft and a second shaft, particularly between the input shaft and the main shaft of the transmission, which can rotate substantially coaxially at different rotational speeds relative to each other, the toothed wheel is mounted upon means, especially a plate between a first and a second axial bearing, and to compensate for axial forces in direction of the axis of rotation of the shafts, between the first shaft and the first axial bearing and between the second axial bearing an the second shaft, respectively, is provided one plate which contacts the relevant shaft in one line and with which conical deforming movements can be effected around the line. By conical deforming movement is to be understood that the flat plate undergoes, by the action for the axial force, a deformation to a tapered annular plate which lends it an outline similar to a plate spring.

In an advantageous development contact area, provided with a radius, are formed which make the linear contact possible between the plate and the shaft. The contact areas can be formed directly on the shaft or advantageously be provided at least partly on a part connected with a shaft. The radius of the contact areas and the thickness of the plate can be advantageously adapted to the axial forces that appear.

With the inventive bearing, the slanted position resulting from the axial forces, especially from the helical gears of the toothed wheels, can be detected and kept away by the axial bearings, especially the roller bearings between the shafts.

BRIEF DESCRIPTION OF THE DRAWINGS

The invention is explained in detail with reference to a drawing.

The single FIGURE shows a section from the transmission with the bearing.

DESCRIPTION OF THE PREFERRED EMBODIMENT(S)

Figure 1:
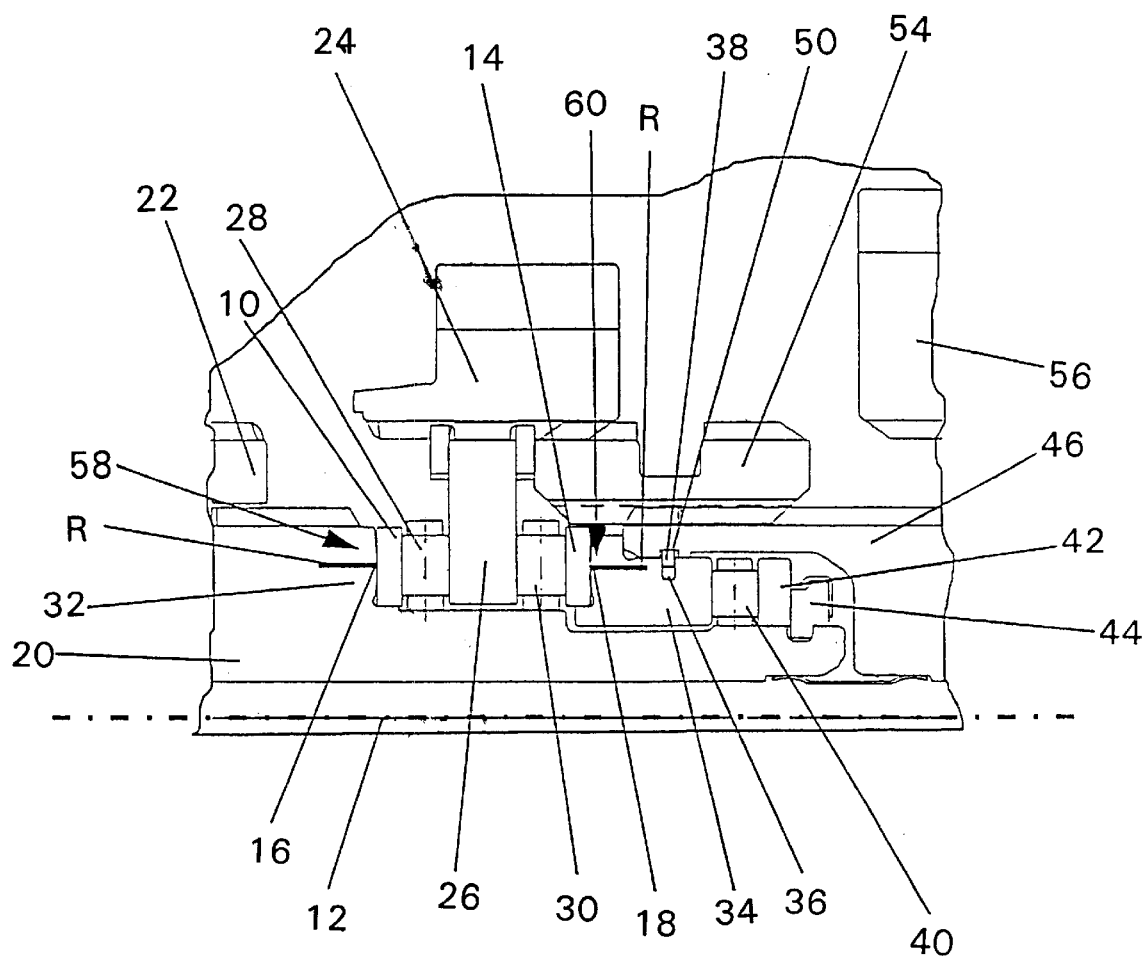

A first shaft 20 carries a sliding sleeve 22 (only partly shown here) which, in addition to a neutral position, can be shifted to a torque-transmitting position between the shaft 20 and a toothed wheel 24, to the "right" in the plane of the drawing. The toothed wheel 24 constitutes a toothed wheel of the second constant of the transmission. The shaft 20 is rotatable around an axis of rotation 12. The toothed wheel 24 is held radially and axially upon the shaft 20 by a plate 26. The plate 26 is axially sandwiched by two roller bearings 28 and 30 whereby the plate 26 and the toothed wheel 24 can freely rotation relative to the shaft 20. The plate 26 supports itself axially in one direction, via the roller bearing 28, first, on a plate 10 which, in turn, abuts on a projection 32 of the shaft 20. On the axially opposite side, the plate 26 supports itself, via the roller bearing 30, first, on a plate 14 which, in turn, abuts on a ring 34. The ring 34 has a recess 36 in which a guard ring 38 meshes. The ring 34 is held axially upon the side opposite to the roller bearing 30 by one other roller bearing 40 and a plate 42 bordering thereon which, in turn, is fixed on the shaft 20 by a guard ring 44.

Over part of its axial extension, the ring 34 lies radially within a second shaft 46 which is also rotatable around the axis of rotation 12. The guard ring 38 is in a recess 50 of the shaft 35 the dimensions of which correspond to those of the recess 36. The shaft 46 carries a dog clutch 53 non-rotatably connected with the shaft 35. The dog clutch 54 is shown in a position which makes a direct torque transmission between the first shaft 20 and the second shaft 35, the torque being transmitted by the shaft 20, first, to the dog clutch 54 and then to the shaft 46, via the sliding sleeve 22 non-rotatably connected with the shaft 20 and the toothed wheel 24. The dog clutch 54 can further be moved out of the neutral position to the "right" in the drawing plane to form a connection between the shaft 35 and a toothed wheel 56, indicated here.

The contact areas 58, 60 are formed with a radius R, between the plate 10 and the projection 32 on the shaft 20 on one side, and between the plate 14 and the ring 34 on the other side. On one side, the projection 32 carries the radius R and, on the other side, the ring 34. By radius R, a linear contact is obtained with the plates 10 and 14. Each of lines 16, 18 represents a circle around the axis of rotation 32.

What is claimed is:

1. A bearing for a toothed gear (24) between a first shaft (20) and a second shaft (46) able to rotate substantially coaxially and at different speeds relative to one another, comprising means (26) provided between a first axial bearing (28) and a second axial bearing (30), upon which the toothed gear (24) is mounted, for compensating for axial forces along a first axis of rotation (12) of said shafts (20, 46);

wherein between said first shaft (20) and said first axial bearing (28) and between said second axial bearing (30) and said second shaft (46), first and second plates (10, 14) are respectively provided which contact the respective shaft (20, 46) on an axial line (16, 18) with the first and second plates (10, 14) to allow conical deforming movement about these contacts at said lines (16, 18).

2. The bearing according to claim 1, wherein on said shafts (20, 46) contact areas (58, 60) are formed which are provided with a radius (R) to make linear contact between said first and second plates (10, 14) and said shafts (30, 46) possible.

3. The bearing according to claim 2, wherein a one contact area (6) is provided on a part (34) which is connected with said second shaft (46).

4. The bearing according to claim 2, wherein said radius (R) of said contact areas (58, 60) and a thickness of said first and second plates (10, 14) are adaptable to axial forces that crop up.

* * * * *